2,936,263

THERAPEUTIC PACKAGE

Leo L. Hardt, Miami Shores, Fla., and Edouard M. Kratz, Gary, Ind., assignors to The Hardt Foundation, a corporation not for profit of Illinois No Drawing. Application September 23, 1958
Serial No. 762,706

3 Claims. (Cl. 167—55)

The invention relates to a therapeutic package comprising a therapeutic substance for the treatment of ulcers, acute gastritis, hypotrophic gastritis, and the like, enveloped in a film consisting essentially of a water soluble hydroxy ethyl ether of polyvinyl alcohol. More particularly the invention relates to packages including capsules made of water soluble hydroxy ethyl ethers of polyvinyl alcohol and containing sodium lauryl sulfate, as well as sodium lauryl sulfate tablets coated with a water soluble hydroxy ethyl ether of polyvinyl alcohol.

The hydroxy ethyl ether of polyvinyl alcohol is sometimes called ethoxylated polyvinyl alcohol or ethoxylated P.V.A.

Water soluble hydroxy ethyl ethers of polyvinyl alcohol already have been made by reacting a polyvinyl alcohol with ethylene oxide in the weight ratios of from 1:1 to 1:2 at temperatures around 50° C. to 150° C., and usually in the presence of a caustic alkali or of a tertiary organic base. Further details of methods of making such ethers of polyvinyl alcohol are disclosed in the Schmidt Patent No. 1,971,662.

Packaging film and capsules have been made of gelatin and also of water soluble polyvinyl alcohol. The gelatin capsules all contain glycerin. Glycerin is also used in making flexible films of polyvinyl alcohol. However, films and capsules which have been plasticized with glycerin will become objectionably softened in high relative humidity and very brittle and tender in low relative humidity. There is also another objection to glycerin, or any other type of humectant, in that they tend to dry out over a period of time, which makes the capsule or film very brittle or fragile, which greatly reduces the dissolution.

The unstable qualities of a humectant polyvinyl alcohol film make it extremely difficult to use the film as a packaging or capsule material, as the film has objectionable stretch in high relative humidity and this makes it almost impossible to forward the film through a capsule or packaging machine. There is also the very objectionable feature of the package or capsules blocking or sticking together in high relative humidity. Furthermore, glycerin containing films tend to sweat and become very slimy and slippery.

So far as we know, there has not been a satisfactory film or capsule material produced from polyvinyl alcohol on a commercial basis.

For the packaging of ulcer treatment materials, such as sodium lauryl sulfate, capsules made of gelatin have not been satisfactory. The applicant, Dr. Leo L. Hardt, has discovered that in general the gelatin capsules containing sodium lauryl sulfate do not entirely dissolve in the stomach. This is particularly true when the patient is given a capsule on an empty stomach, a situation in which sodium lauryl sulfate is particularly effective in the treatment of peptic ulcers.

The applicant, Dr. Leo L. Hardt, has made capsules from water soluble polyvinyl alcohol, but the capsules which do not contain glycerin are too brittle and those which do contain glycerin have the undesirable features mentioned above. However, it was discovered that the water soluble polyvinyl alcohol packages containing sodium lauryl sulfate dissolve very quickly in the stomach and were much more effective than the gelatin capsules containing sodium lauryl sulfate.

The therapeutic packages which were found to be most effective were those in which the antacid material was enveloped in water soluble hydroxy ethyl ether of polyvinyl alcohol. The capsules dissolved almost immediately in the gastric juices. No glycerin or other humectant was necessary to make the capsules flexible and of suitable solubility.

The packages can be made by methods well known to the art, used in making packages of other water soluble film forming material. One method is to dissolve the water soluble hydroxy ethyl ether of polyvinyl alcohol in water, flow the solution over a smooth surface, and evaporate the water to form a film. A sheet making mechanism which is suitable for making film or sheets of water soluble ethers of polyvinyl alcohol is disclosed in the applicant, E. M. Kratz's, Patent No. 2,421,073. Another suitable method and apparatus is disclosed in the applicant, E. M. Kratz's, Patent No. 2,346,764. Packages are then made from the film by forming a tube of the film, filling it with sodium lauryl sulfate or other antacid material, and then heat sealing to form a closed tube containing the antacid material. We can also use dried ethoxylated P.V.A. film, apply it over the solid antacid, and seal it into capsule form. Other ways of making packages, including capsules, will be apparent to those skilled in the art. The dipping or vacuum method of forming capsules is entirely satisfactory.

The term "package" as used in this specification and claims includes the solid antacid material coated with a solution of the ether of polyvinyl alcohol, the liquid being evaporated to give the closely adhering solid coating.

The following example is given to illustrate the invention:

*Example 1*

A hydroxy ethylated polyvinyl alcohol soluble in water, prepared by the method of Example 1, in Schmidt Patent No. 1,971,662, is diluted with water so as to form a solution of 1 to 2 percent strength. This is flowed onto a smooth base, and the water evaporated. The film was stripped from the base and formed into a tube by heat sealing, the tube being open at one end. The tube was then filled with 500 milligrams of sodium lauryl sulfate. The package was made approximately the size of an ordinary gelatin capsule. The package or capsule formed as above described was administered to a patient. Gastroscopic tests showed that the capsule dissolved and released the sodium lauryl sulfate within 3 to 25 minutes, depending upon the thickness of the ethoxylated polyvinyl alcohol capsules, after it had entered the stomach.

The product above described was found to be safe and effective for the treatment of peptic ulcer.

The therapeutic unit dose of sodium lauryl sulfate is 500 to 1500 milligrams.

It was further found that the water soluble ethers of polyvinyl alcohol were also suitable for making packages of other therapeutic materials, but particularly satisfactory results were obtained with antacid materials. Good results were obtained with anion exchange resins, as well as with sodium lauryl sulfate, but with sodium lauryl sulfate fast dissolution is particularly desirable in order to have therapeutic effectiveness, so that the invention is particularly applicable to packages containing sodium lauryl sulfate in a dosage amount effective in the treatment of peptic ulcer.

While sodium lauryl sulfate or other antacid materials may be used alone in the ethoxylated P.V.A. package, it is preferable, particularly with sodium lauryl sulfate, that the antacid be mixed with a stomach coating material, such as mucin, guar gum, sodium alginate, or the like.

We claim:

1. A therapeutic package for the treatment of ulcers, gastritis, and the like, consisting essentially of sodium lauryl sulphate enveloped in a film consisting essentially of a water soluble hydroxy ethyl ether of polyvinyl alcohol.

2. The package of claim 1, wherein the sodium lauryl sulphate is present in from 500 to 1500 milligrams.

3. The package of claim 2, wherein a stomach coating material selected from the group consisting of mucin, guargum, and sodium alginate is present with the sodium lauryl sulphate.

References Cited in the file of this patent

UNITED STATES PATENTS

| | | |
|---|---|---|
| 2,160,503 | Hermann | May 30, 1939 |
| 2,581,035 | Martin | Jan. 1, 1952 |
| 2,774,710 | Thompson | Dec. 18, 1956 |